United States Patent
Igawa

(10) Patent No.: US 6,179,325 B1
(45) Date of Patent: Jan. 30, 2001

(54) AIRBAG DEVICE FOR DRIVER

(75) Inventor: Tadahiro Igawa, Tokyo (JP)

(73) Assignee: Takata Corporation, Tokyo (JP)

( * ) Notice: Under 35 U.S.C. 154(b), the term of this patent shall be extended for 0 days.

(21) Appl. No.: 09/296,244

(22) Filed: Apr. 22, 1999

(30) Foreign Application Priority Data

Apr. 27, 1998 (JP) .................................................. 10-117010

(51) Int. Cl.$^7$ .............................. B60R 21/20; B62D 1/04
(52) U.S. Cl. .................... 280/731; 280/728.3; 200/61.54
(58) Field of Search ................................ 280/731, 728.3; 200/61.54

(56) References Cited

U.S. PATENT DOCUMENTS

| 5,338,059 | * | 8/1994 | Inoue et al. | 280/731 |
| 5,371,333 | * | 12/1994 | Kanai et al. | 280/731 |
| 5,499,841 | * | 3/1996 | Trojan et al. | 280/731 |
| 5,775,728 | * | 7/1998 | Niwa et al. | 280/731 |

FOREIGN PATENT DOCUMENTS

| 8-188109 | 7/1996 | (JP) . |
| 9-66793 | 3/1997 | (JP) . |

* cited by examiner

Primary Examiner—Lanna Mai
Assistant Examiner—Ruth Ilan
(74) Attorney, Agent, or Firm—Kanesaka & Takeuchi

(57) ABSTRACT

An occupant-facing portion 18A of a module cover 18 is divided into flaps 40, 42 defined by the tear lines 30, 32, 34. A sheet switch 50 is disposed in such a manner as to confront only the flap 40. The sheet switch 50 is backed with a backing plate 60. A main portion 62 of the backing plate 60 confronts only the flap 40. The mounting arm 64 extending from the main portion 62 is connected to a retainer 10 and projections 66, 66 projecting from the main portion 62 are engaged with openings 80, 80 of the leg of the module cover. The sheet switch can be actuated by lightly depressing the module cover. The inflator is not required to have large capacity.

9 Claims, 2 Drawing Sheets

AIRBAG DEVICE FOR DRIVER

BACKGROUND OF THE INVENTION AND RELATED ART STATEMENT

The present invention relates to an airbag device for a driver which is installed in a steering wheel of an automobile and more particularly to an airbag device for a driver in which a horn switch is arranged on a hidden side of an occupant-facing portion of a module cover of the airbag device.

An airbag device for a driver comprises an inflator, an airbag, a retainer to which the inflator and the airbag are attached, and a module cover for covering the airbag. The module cover is provided with a tear line. When the inflator is actuated to inflate the airbag, the module cover is torn along the tear line so that the airbag is deployed into a vehicle cabin. When the module cover is torn along the tear line, a flap like a tongue is formed in the module cover and the flap opens into the vehicle cabin.

In one of the driver airbag devices, a horn switch is arranged on the hidden side of an occupant-facing portion of the module cover, so that depressing the occupant-facing portion of the module cover sounds the vehicle horn. An airbag device disclosed in Japanese patent publications 8-188109 and 9-66793 has a horn switch in a form of a sheet or a membrane and a plate for supporting the switch which are arranged on a hidden side of a module cover, whereby the horn switch is actuated just by lightly depressing the module cover. The plate extends over the entire area on the hidden side of the occupant-facing portion of the module cover and both sides of the backing plate are supported by the retainer so that the sheet switch for the horn is supported firmly by the plate. Since the supporting plate is disposed over a tear line of the module cover, the plate should be also provided with a tear line along the tear line formed in an occupant-facing portion of the module cover. When the airbag is inflated by gases spouted from the inflator, the airbag should tear not only the module cover but also the plate along the respective tear lines. As a result thereof the inflator employed in the airbag device of this type should have high pressure for generating gas.

If the supporting plate is arranged within a range of one of the tongue-like flaps defined by the tear line of the occupant-facing portion of the module cover, the plate is not required to have the tear line. In this case, however, since the plate is held by the retainer only at one end thereof, that is, in the cantilevered state, the plate is easily moved backward together with the sheet switch when the switch is depressed so that it is necessary for actuation of the sheet switch to depress the occupant-facing portion of the module cover with relatively strong force.

OBJECT AND SUMMARY OF THE INVENTION

It is an object of the present invention to provide a driver airbag device which has no tear line formed in a backing plate, enables its airbag to be sufficiently quickly inflated with an inflator of small capacity, and enables a sheet switch to be actuated just by lightly depressing an occupant-facing portion of a module cover.

A driver airbag device of the present invention comprises an airbag, an inflator, a retainer to which the airbag and the inflator are attached, a module cover for covering the airbag, a supporting plate which is disposed on a hidden side of an occupant-facing portion of the module cover, and a sheet switch which is disposed between the occupant-facing portion of the module cover and the backing plate. The module cover has a leg which extends from the occupant-facing portion of the module cover and which is attached to the retainer. The supporting plate has a main portion which confronts the occupant-facing portion and a mounting arm which extends from the main portion along the leg and is attached to the retainer. The module cover includes a tear line and at least one area defined by the tear line. The main portion of the supporting plate confronts only the one area. The plate comprises projections which extend from the main portion. The projections are engaged with engaging portions formed in the leg of the module cover, thereby preventing backward movement of the main portion.

The airbag device has the plate disposed only within a range corresponding to the area defined by the tear line of the module cover and the plate has no tear line. The plate does not tear but bends smoothly when pushed by the deploying airbag.

The supporting or backing plate has the projections which are engaged with the leg of the module cover so as to prevent the backward movement of the main portion, so the sheet switch is actuated only by lightly depressing the occupant-facing portion of the module cover.

The projections may be disposed to extend in the opposite direction to each other about the main portion. The engaging portions may be formed at a position of said leg near the occupant-facing portion.

DETAILED DESCRIPTION OF PREFERRED EMBODIMENTS

Figure 1:
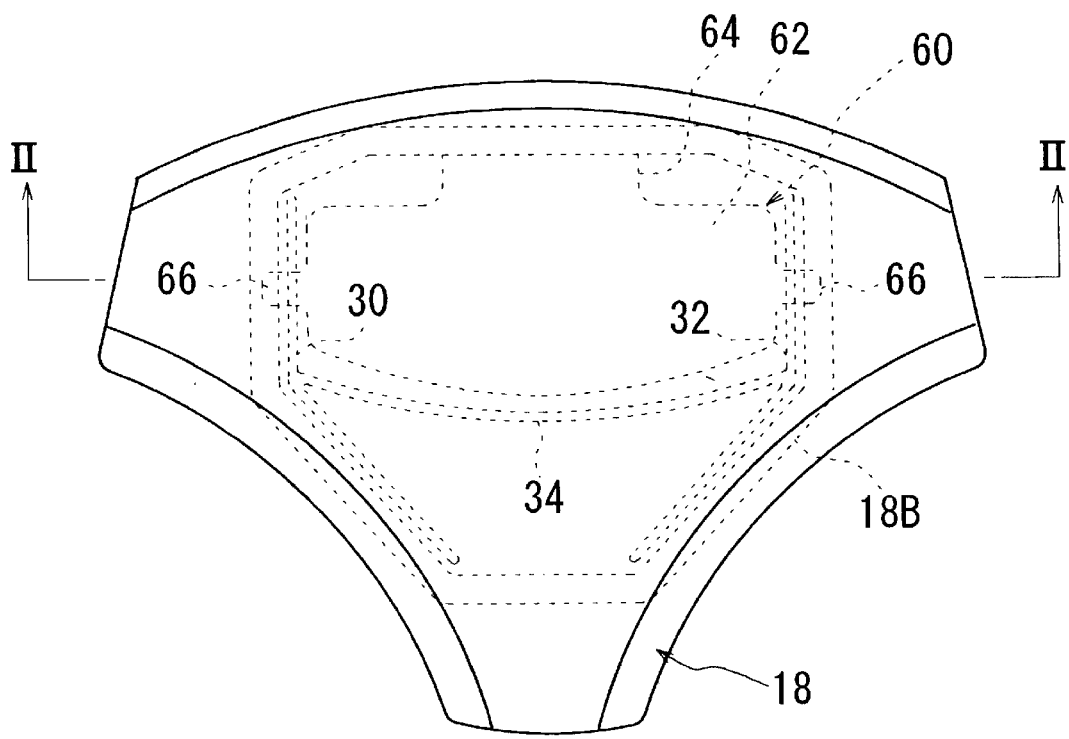
FIG. 1 is a plan view of a driver airbag device according to an embodiment of the present invention.

Hereinafter, embodiments of the present invention will be described with reference to the attached drawings.

A retainer 10 comprises a flat plate portion 14, to which an airbag 12 is attached, and a cover-mounting portion consisting of a side wall 16 extending from the edge of the flat plate portion 14 in a direction apart from an occupant. The airbag 12 in the folded state is covered by a module cover 18. The module cover 18 comprises a main plate portion 18A facing the occupant and a leg 18B extending from a side of the main plate portion 18A. The leg 18B is fixed to the side wall 16 of the retainer 10 by rivets 20. A metal patch 22 is arranged along the leg 18B.

An inflator 24 is fixed to the retainer 10 in such a manner that its upper portion is positioned inside the airbag 12 through an opening 26 formed in the flat plate portion 14. Numeral 28 designates an airbag-mounting member called as a ring. The periphery of the opening of the airbag 12 is clamped between ring 28 and the periphery of the opening 26 of the flat plate portion 14, whereby the airbag 12 is secured to the retainer 10. Fixed to the ring 28 are bolts not shown. The bolts are inserted into the bolt through holes formed in the periphery of the opening of the airbag 12, in the flat plate portion 14 of the retainer, and in a flange 24a of the inflator 24 and nuts are screwed onto the bolts, respectively.

The main plate portion 18A of the module cover 18 includes tear lines 30, 32, 34 on the back thereof. The tear lines 30, 32 extend in the vertical direction of FIG. 1 along the leg 18B on the right side and the left side in FIG. 1. The tear line 34 extends in substantially the central portion of the main plate portion 18A in the lateral direction of FIG. 1 in such a manner as to connect the tear lines 30 and 32.

The main plate portion 18A of the module cover is divided into two areas, which is to form flaps 40, 42, defined by the tear lines 30, 32, 34. When the inflator 24 is actuated to spout gas to inflate the airbag 12, the module cover 18 is torn along the tear lines 30, 32, 34 so that the flaps 40, 42 open outside like tongue plates.

A sheet switch 50 like a membrane for a vehicle horn is disposed in such a manner as to confront only the flap 40 positioned above in FIG. 1. Numeral 52 designates cables for the sheet switch 50. The switch 50 is supported by a plate 60 so that the membrane switch 50 is positioned between the supporting plate 60 and the main plate portion 18A (the flap 40) of the module cover.

The plate 60 has bosses 61 standing thereon. The bosses 61 are inserted into holes 55 of the sheet switch 50 and then pressed with heat, whereby the sheet switch 50 is fixed to the backing plate 60. Another means for fixing them may be employed.

Figure 3:
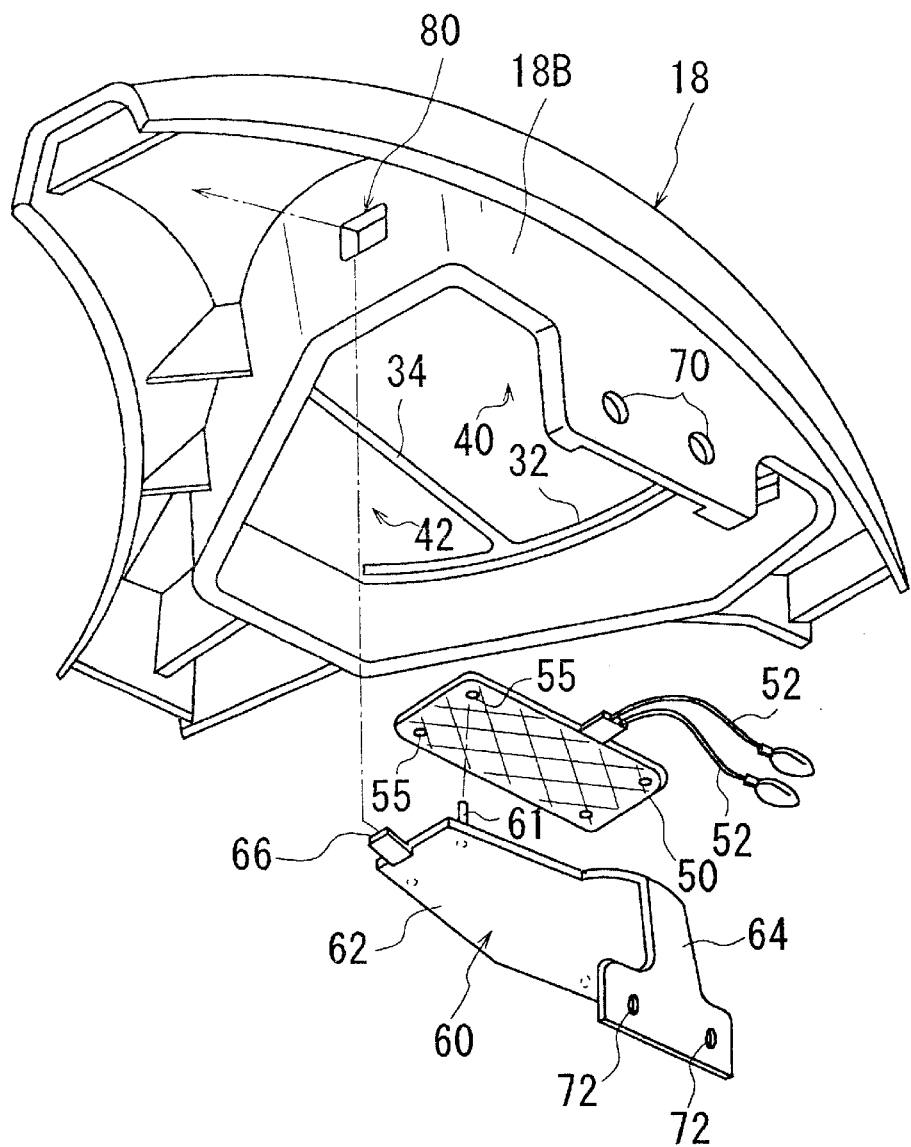
FIG. 3 is a perspective view showing a module cover, a sheet switch, and a backing plate of the driver airbag device.

The backing plate 60 formed in an L-like shape comprises a main part 62 confronting the sheet switch 50 and a mounting arm 64 projecting or extending from the main part 62 in substantially the perpendicular direction. The mounting arm 64 extends along the leg 18B of the module cover 18 and is clamped between the leg 18B and the side wall 16 of the retainer 10. By inserting rivets into rivet holes 70, 72 (FIG. 3) formed in both the leg 18B and the mounting arm 64 and the rivet holes (not shown) formed in the side wall 16, the mounting arm 64 is connected to the retainer 10.

Figure 2:
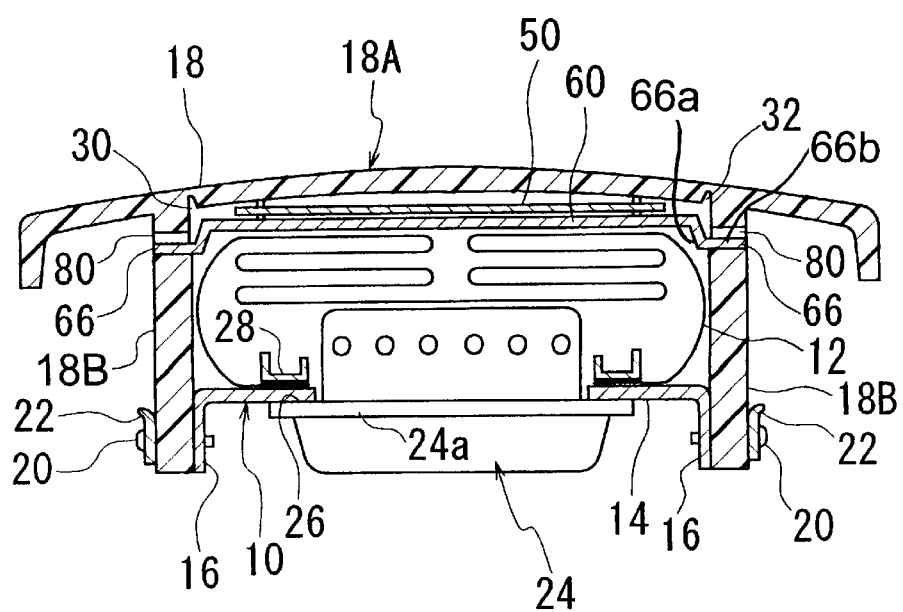
FIG. 2 is a sectional view taken along a line II—II of FIG. 1.

The main part 62 of the plate 60 is provided with projections 66, 66 extending toward the right and left of FIG. 1. The projections 66, 66 are engaged with openings 80, 80 of the leg 18B after passing over the tear lines 30, 32, respectively. As shown in FIG. 2, the projections 66, 66 are in contact with the lower edges of the openings 80, 80. Therefore, when the main plate portion 18A of the module cover is depressed, the sheet switch 50 and the backing plate 60 are not moved backward so that the switch 50 is actuated.

As illustrated, the openings 80, 80 of the leg 18B are positioned near the main plate portion 18A. Accordingly, the projections 66, 66 are disposed to project from the main part 62 in substantially the lateral direction. Since each projection 66 is cranked as shown in FIG. 2, the cranked portion, i.e. vertical portion 66 and horizontal portion 66b, can be easily deformed during the inflation of the airbag.

When the inflator 24 is actuated due to a vehicle collision, a large amount of gas is rapidly spouted out of the inflator 24 so that the airbag 12 starts to expand. The expanding airbag 12 pushes the module cover 18 and the cover 18 tears along the tear lines 30, 32, 34 to form the flaps 40, 42 which open outwardly. As a result, the airbag 12 expands rapidly into the vehicle cabin to protect the occupant.

During the inflation of the airbag 12, the mounting arm 64 of the plate 60 is bent at a position near the main part 62 so that the main part 62 also opens toward the vehicle cabin together with the flap 40. At this point, also the projections 66, 66 bend and they come off the openings 80, 80.

Since the main part 62 of the plate 60 confronts only the flap 40 and does not extend over the tear lines 30, 32, 34, the plate 60 never interferes the tearing of the module cover 18 along the tear lines 30, 32, 34. During the expansion of the airbag 12, the plate 60 bends only at the mounting arm 64 and the projections 66, 66 so as not to interfere the deployment of the airbag 12. Therefore, the inflator 24 is not required to have high pressure for generating gas.

Figure 4:
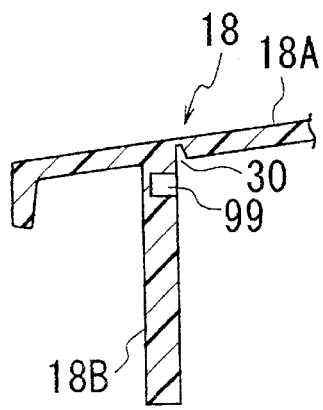
FIG. 4 is a sectional view of a module cover having recesses instead of openings.

Though the projections 66, 66 are engaged with the openings 80, 80 of the leg 18B in the aforementioned embodiment, the leg 18B may be provided with recesses 99, 99 formed in the inner surface thereof instead of the openings 80, 80 as shown in FIG. 4.

As described above, in the driver airbag device of the present invention, the sheet switch can be actuated by lightly depressing the module cover. The bag can be deployed at a predetermined speed without increasing the gas pressure of the inflator.

What is claimed is:

1. An airbag device for a driver comprising:
    an airbag,
    an inflator for providing gas to the airbag for inflation,
    a retainer for holding the airbag and the inflator,
    a module cover for covering the airbag including an occupant facing portion with a rear side, a leg portion extending from the rear side and attached to the retainer, a tear line to define at least a first area in the occupant facing portion, and engaging portions formed in the leg portion and having lower edges arranged to face the rear side,
    a supporting plate having a main portion situated near the rear side of the first area of the occupant facing portion, a mounting arm extending from the main portion along the leg and attached to the retainer, and projections extending outwardly from the main portion, each of said projections being situated in a corresponding engaging portion and placed on the lower edge of the corresponding engaging portion, and
    a sheet switch disposed between the occupant-facing portion and the supporting plate, said sheet switch being supported by the supporting plate engaging the leg portion at the projections and the mounting arm attached to the retainer so that when the occupant-facing portion is depressed, the sheet switch is actuated smoothly.

2. The driver airbag device as claimed in claim 1, wherein said projections are disposed to extend in opposite directions to each other about the main portion.

3. The driver airbag device as claimed in claim 1, wherein said engaging portions are openings.

4. The driver airbag device as claimed in claim 1, wherein said engaging portions are recesses.

5. The driver airbag device as claimed in claim 1, wherein said engaging portions are formed at positions of said leg near the occupant-facing portion.

6. The driver airbag device as claimed in claim 1, wherein said tear line defines the first area and a second area, which form flaps when the inflator is actuated.

7. The driver airbag device as claimed in claims 1, wherein said supporting plate is formed in a L-shaped configuration such that the main portion and the mounting arm are substantially perpendicularly connected to each other.

8. The driver airbag-device as claimed in claim 1, wherein each of he projections has a crank shape having a vertical portion and a horizontal portion, said horizontal portion being located in the engaging portion.

9. The driver airbag device as claimed in claim 8, wherein said tear line is located adjacent to the leg, said projection having the crank shape being located under the tear line to allow the projection to bend easily when the airbag is inflated.

* * * * *